United States Patent [19]

Dye

[11] Patent Number: 4,795,292
[45] Date of Patent: Jan. 3, 1989

[54] CHUCK FOR ROTARY METAL CUTTING TOOL

[76] Inventor: Leonard Dye, 11640 Davis St., Moreno Valley, Calif. 92388

[21] Appl. No.: 54,761

[22] Filed: May 27, 1987

Related U.S. Application Data

[63] Continuation-in-part of Ser. No. 773,028, Sep. 6, 1985, Pat. No. 4,669,933.

[51] Int. Cl.<sup>4</sup> .................... B23B 27/10; B23C 5/28
[52] U.S. Cl. ................................ 409/136; 279/20; 407/11; 408/59; 408/60; 409/234
[58] Field of Search ............... 408/57, 59, 60, 61, 408/239 R; 279/20; 409/135, 136, 232, 234; 407/11; 175/324

[56] References Cited

U.S. PATENT DOCUMENTS

| | | | |
|---|---|---|---|
| 1,426,681 | 8/1922 | Smith et al. | 408/57 X |
| 2,360,385 | 10/1944 | Anderson | 408/59 |
| 3,364,800 | 1/1968 | Benjamin et al. | 408/59 X |
| 3,460,410 | 8/1969 | Briles | 408/57 |
| 4,213,354 | 7/1980 | Dahinden | 408/61 X |
| 4,557,643 | 12/1985 | Cioci | 408/59 X |
| 4,570,952 | 2/1986 | Heimbigner et al. | 408/61 X |
| 4,636,118 | 1/1987 | Hunt | 279/20 X |
| 4,669,933 | 6/1987 | Dye | 408/59 X |

*Primary Examiner*—Gil Weidenfeld
*Assistant Examiner*—Steven C. Bishop
*Attorney, Agent, or Firm*—Charles H. Thomas

[57] ABSTRACT

A chuck for a cylindrical rotary metal cutting tool, such as an end mill, is provided with a liquid coolant system. The chuck is constructed to direct cooling liquid onto a cutting tool secured in an axial bore defined therein with a plurality of converging liquid streams directed at the tool. The chuck is constructed with alternative passageways. Liquid coolant may be directed along a central, axial cooling liquid passageway remote from a transverse end face of the chuck. Liquid may pass radially outwardly therefrom through radial bores and into intersecting longitudinal cooling liquid distribution ducts which are inclined toward the axis of the tool holder and which terminate in outlet ports in the end face. The radial bores are plugged at locations radially outwardly from the intersection of the ducts with the radial bores. Alternatively, liquid coolant may be carried through an annular manifold and directed radially inwardly into a plurality of arcuate, concave liquid distribution troughs located on the outer surface of the tool holder, and radially inwardly through the radial bores. Interior plugs within the tool holder force the liquid coolant into the inclined ducts. A removable end plate with diverting apertures may be fastened to the end face of the tool holder to divert liquid coolant onto a cutting tool with streams of liquid impinging thereon at selected angles.

10 Claims, 1 Drawing Sheet

CHUCK FOR ROTARY METAL CUTTING TOOL

BACKGROUND OF THE INVENTION

The present application is a continuation-in-part of U.S. application Ser. No. 773,028 filed Sept. 6, 1985, now U.S. Pat. No. 4,669,933 issued June 2, 1987.

1. Field of the Invention

The present invention relates to an improved, versatile, liquid cooled chuck for rotary, metal cutting tools, such as end mills.

2. Description of the Prior Art

There are numerous metal machining operations which employ cylindrical bits rotated at high speed to cut metal chips from a workpiece. Exemplary among such devices are end mills, shell mills, drills, routers, reams, bores, and other high speed, rotary systems which cut metal with a sharp bit. Various liquid coolant systems have been devised in attempts to prevent mill and drill bits from becoming dull rapidly. In conventional practice the bit of a drill or milling machine is cooled by merely spraying water from a distance onto the rotating bit of the milling machine or drill. However, in actuality very little cooling water reaches the tip of the bit and most of the water is thrown from the bit by centrifugal force or drops from the bit due to the force of gravity. As a result, the milling machine or drill bit will typically overheat and become dull. Furthermore, chips of material which are cut from the metal stock tend to cling to a mill or drill bit, thereby increasing the heat generated. This reduces the quality of milling and also dulls the bit more rapidly.

One prior, improved chuck for a rotary cutting tool is described in my prior U.S. patent application Ser. No. 773,028, filed Sept. 6, 1985, now U.S. Pat. No. 4,669,933 issued June 2, 1987. However, the chuck described in my prior application has one disadvantage in that an annular groove must extend around the entire circumference of the tool holder. This annular groove is necessary to provide a channel of continuous communication from a stationary collar, located concentrically about the tool holder at the channel, and internal ducts within the tool holder which are inclined toward the axis of the tool. The existence of such an annular channel in the outer surface of the tool holder creates a certain amount of weakness in the tool holder. Moreover, my prior system requires an annular, cooling liquid distribution collar within which the tool holder must rotate in sliding engagement with the collar. In such systems a considerable amount of leakage of cooling liquid can develop at the interface between the tool holder and the collar within which the tool holder rotates. This leakage reduces the amount of cooling liquid which ultimately reaches the cutting tool. Moreover, many machine shops do not employ annular cooling liquid manifolds, but instead provide cooling liquid supply systems which are adapted to supply cooling liquid into a central, axial cooling liquid passageway defined within the spindle of the tool holder. Thus, while the improved chuck of my prior invention may be advantageously employed in supplying cooling liquid to rotary cutting tools in certain installations, it lacks versatility for use in other machine shop cutting tool coolant systems.

SUMMARY OF THE INVENTION

The present invention is an improved chuck for a cylindrical rotary tool for cutting away metal. The chuck of my new invention is comprised of a cylindrical, annular rotatable tool holder having a transverse end face in which an axial bore is defined to receive a cylindrical tool. A plurality of radial liquid distribution bores are defined in the tool holder and are tapped or otherwise equipped with some form of fastener to receive plugs therein. A plurality of arcuate, transverse concave grooves are defined in the outer surface of the tool holder. One groove is defined in the outer surface of the tool holder at each radial bore. The grooves are located remote from the end face at which the cooling liquid ultimately emanates. The grooves thereby define a plurality of discontinuous, arcuate cooling liquid distribution troughs. A plurality of cooling liquid distribution ducts are defined in the tool holder so as to intersect the radial liquid distribution bores proximate to the liquid distribution troughs. Preferably, the ducts are defined at an inclination toward the axis of the tool holder to terminate in outlet ports in the end face. The outlet ports are located closer to the axis of the tool holder than are the intersections of the cooling liquid distribution ducts with the radial liquid distribution bores.

In a preferred embodiment of the invention the tool holder includes a central, axial cooling liquid passageway remote from the transverse end face of the tool holder. The axial passageway intersects the radial liquid distribution bores. The radial bores are internally threaded at intersections with the liquid distribution troughs. The radial bores are also internally threaded between their intersections with the liquid distribution ducts and their intersections with the central axial passageway. Thus, plugs may be threadably engaged in the radial bores to define two, altenative paths of cooling liquid supply.

If the cooling liquid supply coupling arrangement is adapted to supply cooling liquid through the spindle of the tool holder to the central, axial cooling liquid passageway, the plugs are threadably engaged in the radial bores between the intersections of the bores with the arcuate, liquid distribution troughs and their intersections with the liquid distribution ducts. Cooling liquid then travels along the central, axial liquid passageway and is directed radially outwardly through the radial bores to the plugs. The plugs prevent the liquid from leaving the tool holder at the liquid distribution troughs. The plugs instead force the liquid through the liquid distribution ducts, where it emerges from the outlet ports at the end face in streams directed onto the tool bit.

Alternatively, the plugs may be engaged in the radial bores at locations between the intersections of the radial bores with the liquid distribution ducts and the intersections of the radial bores with the central, axial cooling liquid passageway. When the plugs are disposed in this fashion the system is provided with an annular cooling liquid distribution collar having a cooling liquid inlet and positioned about the tool holder in sliding contact therewith and in communication with the cooling liquid distribution troughs. The tool holder rotates within the collar. Cooling liquid, under pressure travels along a cooling liquid path from the cooling liquid inlet to the collar, through the annular collar, and into the distribution troughs. From the cooling liquid distribution troughs the liquid travels radially inwardly into the radial bores and is deflected by the plugs into the liquid distribution ducts. The liquid then likewise emerges from the end face of the tool holder through the outlet ports in streams directed onto the tool bit.

In one embodiment of the invention the liquid distribution ducts are oriented at an inclination toward the axis of the tool holder from their intersections with the radial liquid distribution bores. With this duct configuration the outlet ports are located closer to the axis of the tool holder than are the intersections of the cooling liquid distribution ducts with the radial liquid distribution bores. The resultant effect is to supply cooling liquid in jets which converge upon the cutting tool held in the holder.

In an alternative embodiment of the invention the liquid coolant ducts in the tool holder need not be inclined toward the axis of the tool holder, but rather are parallel to the tool holder axis. In this alternative embodiment the tool holder may be equipped with an end plate which is removably attached across the end face of the tool holder. The end plate has a central opening coaxial with the axial bore in the tool holder, and separate radially displaced liquid passageway openings are aligned with each of the outlet ports. While the longitudinal ducts through the tool holder are not inclined toward the tool holder axis, the passageway openings in the end plate are so inclined. Thus, in this embodiment, as in the embodiment where the ducts in the tool holder are inclined toward the tool holder axis, cooling liquid is ejected as a plurality of jets which converge on the cutting tool.

In yet another alternative embodiment nozzles are provided at the outlet ports in place of the end plate. The nozzles are secured in the outlet ports and deflect cooling liquid from the liquid distribution ducts onto the tool bit at an angle of inclination thereto.

The chuck of the invention is comprised of a cylindrical, annular rotatable tool holder having a transverse end face in which an axial bore is defined to receive the shank of a cylindrical cutting tool. Where the cutting tool is an end mill, some means, such as one or more set screws are provided for securing the tool shank in the tool holder so that it turns in rotation with the tool holder. The tool shank typically has a flat side against which the set screws bear.

The invention may also be applied to a shell mill holder. In a shell mill holder, a cylindrical annular sleeve is centered on the transverse end face and projects axially therefrom. The internal wall of the sleeve is tapped to receive a threaded draw bolt which serves as a releasable fastener for immobilizing the tool to rotate with the tool holder. Axially projecting keys are also defined on the transverse end face and extend radially outwardly from the internal sleeve. These keys fit into corresponding slots on the shell mill. The keys and slots cooperate to lock the shell mill so that is rotates with the shell mill holder. The draw bolt fits into an axial counterbore in the shell mill and extends through an axial bore in the shell mill to engage the threads of the internal wall of the sleeve. The remaining structure of the shell mill holder corresponds to that of an end mill holder, as described in the preceeding paragraph.

A tool holder constructed according to the invention has a very significant advantage over the conventional practice of spraying water onto a rotating metal cutting tool. The liquid distribution ducts, when considered as projected onto a plane containing the holder axis, are inclined at an acute angle so that the water emerging from the outlet ports is directed toward the cutting tool with both radial and longitudinal components of force. The longitudinal component of force tends to carry the water to the remote, free end of the cutting tool, while the radial component of force acts in opposition to the centrifugal force tending to fling the water away from the cutting tool. A cooling effect is needed most at the remote free end of the cutting tool before the centrifugal force imparted to the water by the rotating cutting tool flings the water free from the rotating tool.

The angle at which the ducts are preferably formed in the tool holder relative to the tool holder axis, when considered in a plane containing the tool holder axis, is ideally the maximum acute angle which will overcome the centrifugal force imparted to the water but still allow the coolant to reach the tip of the cutting tool. The greater the rotary speed of the tool holder, the greater the desired incline of the liquid distribution ducts inward towardly the tool holder axis. That is, the ducts should be more steeply inclined relative to the tool holder axis for a high rotary speed in order to overcome the greater, opposing centrifugal force tending to throw the water clear from the cutting tool.

The preferred angle of the inclination of the ducts relative to the tool holder axis will also increase with the diameter of the metal cutting bit. The desired angle will decrease with increasing liquid pressure and flow rate. Typically the ducts are each inclined toward the holder axis at an acute angle between about two degrees and about thirty degrees, when considered as projected onto a plane containing the duct and the tool holder axis. Also, when the flutes of the tool bit are helical, the ducts are preferably oriented somewhere between longitudinal alignment with the tool bit and an angle in alignment with the helical angle of the flutes, when considered in planes oriented perpendicular to radial lines from the tool holder axis.

The improved chuck of the invention may be used with machine tools that are rotated about either a vertical or a horizontal axis. The chuck of the invention is used most advantageously with a roughing type end mill where intense heat is created, and with tools which are rotated about horizontal axes.

The improved chuck of the invention is extremely versatile and may be utilized with liquid coolant supply systems in which liquid coolant is supplied either axially to a central, axial cooling liquid passageway through the spindle of the tool holder, or radially inwardly from an annular hollow, coolant manifold disposed about the holder and within which the tool holder rotates.

The use of a removable end plate provides the improved chuck of the invention with further versatility. The end plate is preferably bolted onto the end face of the tool holder and held in liquid tight, sealing engagement therewith. Interchangable end plates may be utilized for different metal cutting tools. The liquid passageway openings in the end plate selected for a particular tool will deflect the flowing cooling liquid to the angle relative to the tool and tool holder axis which is most appropriate for the metal cutting tool mounted in the axial bore of the tool holder. For example, the flutes of some milling tools, such as some end mills, are straight and extend parallel to the axis of the tool. An end plate in which the axes of the passageway openings intersect the tool holder axis is most appropriate for such end mills.

Most end mills have flutes that are oriented in a helical spiral about the axis of the end mill bit, however. It may be desirable for the liquid passageway openings in the interchangeable end plate employed to be aligned to follow the helical orientation of the end mill flutes. For example, the liquid passageway openings may be oriented at an angle of about three and one half degrees from a line perpendicular to the end face of the tool holder, as measured in a plane parallel to the tool holder axis and perpendicular to a radial line emanating therefrom. This inclination is in addition to any inclination which the liquid passageway openings may have toward the tool holder axis as measured in planes intersecting the liquid passageway openings and containing the tool holder axis. The inclination of the liquid passageway openings as measured in planes perpendicular to the tool holder end face and to radial lines emanating from the tool holder axis and parallel to the tool holder axis may be as much as twenty seven and one half degrees or even thirty degrees to accommodate some shell mills.

The invention may be described with greater clarity and particularity by reference to the accompanying drawings.

DESCRIPTION OF THE DRAWINGS

FIGS. 1-3 illustrate two embodiments of an improved end mill chuck according to the invention which employ the same tool holder. Both of these embodiments are comprised of a cylindrical annular tool holder 10, depicted in FIG. 1, having a transverse end face 12 with an axial bore 14 defined therein perpendicular to the end face 12. The bore 14 is adapted to receive the shank of a solid, cylindrical end mill or other metal cutting tool. A plurality of radial liquid distribution bores 16 are defined in the tool holder 10 and are adapted to engageably receive plugs therein, such as the plugs 18 depicted in FIGS. 2 and 3. A plurality of transverse arcuate, discontinuous concave liquid distribution troughs 20 are defined in the outer surface of the tool holder 10 remote from the end face 12. The troughs 20 are formed in a plane perpendicular to the axial bore 14 centered over each of the radial liquid distribution bores 16. Separate liquid distribution ducts 22 are formed within the tool holder 10 to intersect each of the liquid distribution bores 16 at intersections indicated at 24 in FIGS. 1 and 3. The ducts 22 terminate at outlet ports 26 which are defined in the end face 12 proximate to the axial bore 14 therein. In the tool holder 10 the outlet ports 26 are closer to the axis of the axial bore 14 than are the intersections 24 of the liquid distribution ducts 22 with the liquid distribution bores 16.

Figure 2:
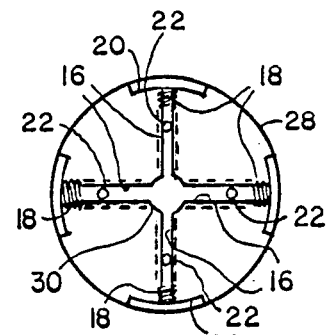
FIG. 2 is a transverse sectional view of the improved chuck of the invention taken along the lines 2—2 of FIG. 1 showing the tool holder of FIG. 1 employed in one arrangement.
Figure 3:
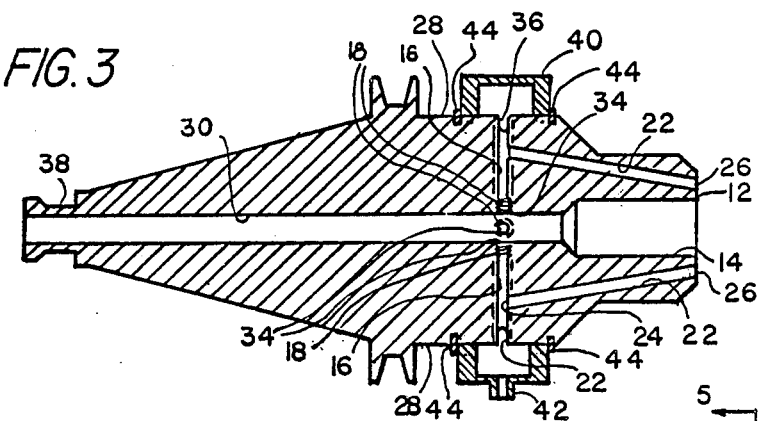
FIG. 3 is a side elevational sectional view of an alternative embodiment of the chuck of the invention employing the tool holder of FIG. 1 in an alternative arrangement.

Four different radial liquid distribution bores 16 oriented 90 degrees apart, are defined in the tool holder 10, as depicted in FIG. 2. All of the bores 16 are internally tapped throughout to receive plugs 18 which are threadably engaged therein. The plugs 18 may be engaged in liquid tight sealing arrangement anywhere along the bores 16 from adjacent the arcuate troughs 20, as depicted in FIG. 2, or interiorly from the interfaces 24 as depicted in FIG. 3.

The arcuate troughs 20 do not form an annular channel in the outer surface 28 of the tool holder 10, but to the contrary are formed as a plurality of separated, transverse, concave grooves, defined discontinuously in the outer surface 28 of the tool holder 10. A separate liquid distribution trough 20 is centered over each of the radial bores 16 and extends over an arc of preferably between about 45 and 65 degrees. The cooling liquid distribution troughs 20 are formed as separated discontinuous, arcuate grooves rather than as an annular continuous channel so as to avoid unnecessarily weakening the structure of the tool holder 10.

The radial liquid distribution bores 16 intersect the axial passageway 30 at intersections 34. As previously noted, the radial bores 16 are tapped throughout their lengths and are therefore internally threaded both at their intersections 34 with the passageway 30 and at their intersections 36 with the liquid distribution troughs 20 formed by the segmental grooves in the outer surface 28 of the tool holder 10. While the bores 16 which are depicted are threaded their entire lengths for ease of machining, it is important only that they are threaded at some location between their intersections with the troughs 20 and the ducts 22 and at some location interiorally of the ducts 22 between the ducts 22 and the intersections 34 with the axial passageway 30.

As illustrated in FIG. 2, the plugs 18 may be threadably engaged with the radial bores 16 between the intersections 24 and 36 of the radial bores 16 with the liquid distribution ducts 22 and the troughs 20, respectively. The plugs 18 may be engaged at the intersections 36 of the bores 16 with the liquid distribution troughs 20. When the plugs 18 are positioned in the manner depicted in FIG. 2, a cooling liquid path of travel is defined along the central, axial cooling liquid passageway 30, radially outwardly past the intersections 34, through the radial bores 16 to the plugs 18, and through the liquid distribution ducts 22 to emerge from the end face 12 at the outlet ports 26. With the plugs 18 positioned as depicted in FIG. 2, cooling liquid is supplied from a coupling at the spindle 38 of the tool holder 10. Since the cooling liquid distribution ducts 22 are defined in the tool holder 10 to intersect the radial distribution bores 16 at the intersections 24 proximate to the liquid distribution troughs 20 and are oriented at an inclination toward the axis of the tool holder 10, the outlet ports 26 in the end face 12 are located closer to the axis of the tool holder 10 than are the intersections 24 of the cooling liquid distribution ducts 22 with the radial liquid distribution bores 16. With the plug arrangement of FIG. 2, cooling liquid supplied through a coupling at the tool holder spindle 38 is directed in converging fashion toward the tool holder axis from the outlet ports 26.

The angle of inclination of the liquid distribution ducts 22 relative to the axis of the tool holder 10 when measured in a plane containing the tool holder axis is preferably between about three degrees and fifteen degrees and may, for example, be seven and one half degrees. Cooling liquid emanating from the outlet ports 26 arrives with a longitudinal component of force toward the cantilevered tip of the cutting tool held in the axial bore 14 and with a radially inwardly directed component of force. The streams of water emanating from the outlet ports 26 thereby resist the centrifugal force imparted by the rotating cutting tool bit which tends to cast the water outwardly away from the bit. The water thereby remains in contact with the bit along its entire length, and is thus able to perform the intended function of cooling the bit to prevent it from becoming dull quickly. Also by remaining in contact with the metal cutting bit longer, the water is also able to flush chips of metal away from the tip of the bit. This improves the ability of a machinist to control the chips and enables the end bit, or any other cutting bit, to take a greater depth of cut.

The improved metal cutting tool chuck of the invention may also be utilized with systems which employ an annular cooling liquid distribution collar 40, of the type depicted in FIG. 3. The cooling liquid distribution collar 40 depicted at FIG. 3 has a cooling liquid inlet 42. The liquid distribution collar 40 remains stationary while the tool holder 10 rotates therewithin in sliding contact therewith. Annular snap rings 44 are located in shallow, annular grooves in the outer surface 28 of the tool holder 10 so as to straddle the liquid distribution collar 40. The snap rings 44 prevent the liquid distribution collar 40 from shifting longitudinally on the outer surface 28 of the tool holder 10. The annular liquid distribution channel defined within the collar 40 is in communication with the liquid distribution troughs 20.

The plugs 18 may be threadably engaged in the bores 16 and then advanced all the way into the radial bores 16 to their intersections 34 thereof with the axial passageway 30, as depicted in FIG. 3. With the plugs 18 engaged as illustrated in FIG. 3, a cooling liquid path of travel is defined from the cooling liquid inlet 42, through the annular collar 40 and into the liquid distribution troughs 20. The cooling liquid passes radially inwardly into the radial bores 16 and through the liquid distribution ducts 22 to emerge from the end face 12. As with the arrangement of FIG. 2, the cooling water emanating from the outlet ports 26 is directed longitudinally toward the cantilevered end of a bit held within the axial bore 14, as well as toward the tool holder axis. Because the plugs 18 are interposed between the axial cooling liquid passageway 30 and the liquid distribution ducts 22, liquid supplied from the annular collar 40 is isolated from the axial passageway 30 and is thereby forced through the liquid distribution ducts 22.

It can be seen that by selectively positioning the plugs 18 either between the intersections 24 of the liquid cooling ducts 22 with the radial bores 16 and the intersections 36 of the radial bores 16 with the liquid distribution troughs 20, as depicted in FIG. 2, or alternatively between the intersections 34 of the radial bores 16 with the axial passageway 30, and the intersections 24 of the bores 16 with the liquid distribution ducts 22, alternative cooling liquid paths of travel are defined. With the plugs 18 engaged in the radial bores 16 between the troughs 20 and the liquid distribution ducts 22, as depicted in FIG. 2, a liquid path of fluid flow is defined from the axial passageway 30, through the radial ducts 16, and into the liquid distribution ducts 22. Alternatively, when the plugs 18 are engaged in the radial bores 16 between the intersections 24 of the ducts 22 with the radial bores 16 and the intersections 34 of the bores 16 with the axial passageway 30, a path of coolant flow is defined radially inwardly from the annular collar 40, through the troughs 20, into the radial ducts 16, and along the liquid distribution ducts 22.

Figure 4:
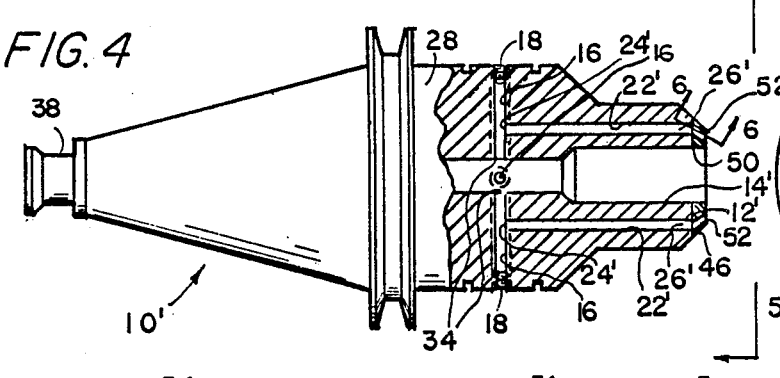
FIG. 4 is a side elevational view showing an alternative embodiment of a chuck according to the invention, depicted partially in section taken along the tool holder axis.
Figure 5:
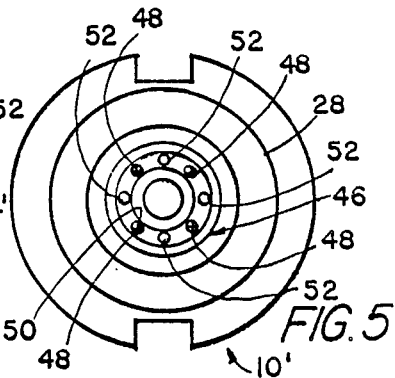
FIG. 5 is an end view taken along the lines 5—5 of FIG. 4.
Figure 6:
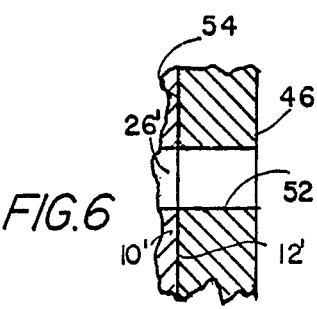
FIG. 6 is a sectional detail taken along the lines 6—6 of FIG. 4.

FIGS. 4, 5 and 6 illustrate an alternative embodiment of the improved tool chuck of the invention. The tool holder 10' depicted in FIGS. 4 and 5, is similar in many respects to the tool holder 10, and the component structural elements which find equivalent structure in the tool holder 10 are indicated by primed reference numbers corresponding thereto in FIGS. 4 and 5.

The tool holder 10' differs from the tool holder 10 in that the liquid distribution ducts 22' are not inclined toward the axis of the tool holder 10', but rather extend parallel to the axis of the tool holder 10'. The end face 12' of the tool holder 10' is not exposed, but to the contrary one of several interchangable disk-shaped end plates 46 is removably secured in contact therewith by means of machine screws 48 which extend into the structure of the tool holder 10' parallel to the tool holder axis, as depicted in FIG. 5. The end plate 46 is a generally annular, disk-shaped structure and has a central, circular axial opening 50 defined therethrough. The opening 50 is of a diameter equal to the diameter of the bore 14' in the tool holder 10'.

The end plate 46 is removably secured to the transverse end face 12' and has apertures defined therein. The apertures form separate liquid passageway openings 52 which are radially displaced from the central opening 50. At the interface surface 54 of the end plate 46 the liquid passageway openings 52 are aligned with each of the outlet ports 26' and are inclined therefrom toward the axis of the tool holder 10', as illustrated in FIG. 4. The liquid passageway openings 52 are thereby oriented to receive flowing liquid from the liquid distribution ducts 22' and to divert that liquid flow toward the axis of the axial bore 14'. In the embodiment of FIGS. 4, 5 and 6 each of the axes of the liquid passageway openings 52 lies in a plane containing the axis of the tool holder 10'.

With some cutting tools it may be desirable for the liquid passageway openings of an end plate to be aligned so as to divert liquid flow therefrom in jets which do not intersect the axes of the axial bore 14'. To the contrary, it may be desirable for the axis of the liquid passageway openings to extend in a skew orientation relative to the axis of rotation of the tool holder 10'.

Figure 7:
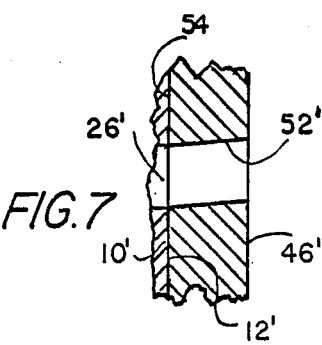
FIG. 7 illustrates a liquid passageway opening orientation alternative to that of FIG. 6.

FIG. 6 is a sectional detail of one of the axial passageways 52 of the end plate 46 taken in a plane containing the liquid passageway opening axis and intersecting the axis of rotation of the tool holder 10'. FIG. 7, on the other hand, is a comparable detail of a single liquid passageway opening 52' of an alternative, interchangable end plate 46'. The end plate 46' may be fastened to the end face 12' of the tool holder 10' in place of the end plate 46 by means of the machine bolts 48 in the manner depicted in FIG. 5. Unlike the liquid passageway openings 52, however, the liquid passageway openings 52' are also inclined laterally such that the axis of the liquid passageway openings 52' do not lie in planes containing the axis of rotation of the tool holder 10' and a liquid distribution duct 22'. The orientation of the passageway 52' is laterally inclined at an angle of about 3½ degrees in the direction of a helical angle of a flute of a metal cutting tool which is held in the axial bore 14'.

Figure 8:
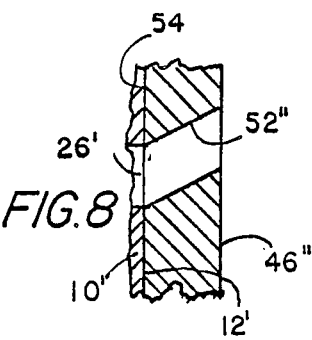
FIG. 8 illustrates another liquid passageway opening orientation alternative to that of FIG. 6.

FIG. 8 is a detail of another single liquid passageway opening 52" in another alternatively interchangable end plate 46". The lateral angle of inclination of the axis of the liquid passageway opening 52" is even greater than that of the liquid passageway opening 52', and may, for example, be 27½ degrees. The end plate 46" might, for example, be utilized with an end mill, where there is a very substantial angle of helical orientation of the milling flutes.

The apertures 52' of the end plate 46' as well as the apertures 52" of the end plate 46" are congruent with the outlet ports 26' of the tool holder 10' where the interface surface 54 of the end plate resides in contact with the end face 12'. However, the apertures 52' and 52" are aligned to divert liquid flow therefrom in jets which do not intersect the axis of the axial bore 14'. To the contrary, the axes of the apertures 52' and 52" are inclined to predetermined degrees as illustrated in FIGS. 7 and 8, considered in planes oriented perpendicular to radial lines from the tool holder axis.

Figure 9:
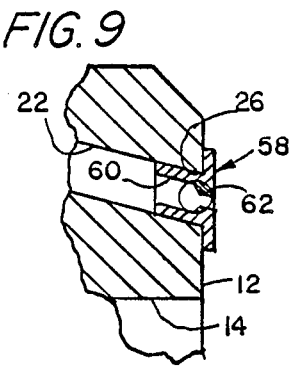
FIG. 9 is an elevational sectional detail showing a modification to the embodiment of FIG. 3.

FIG. 9 illustrates another modification of the embodiment of either FIG. 2 or FIG. 3 which employs an arrangement for directing the flow of cooling water from the water distribution ducts 22 at an angle toward the axis of the axial bore 14. In the modification of FIG. 9 adjustably positionable nozzles 58 are positioned in the outlet ports 26 of the liquid distribution ducts 22 instead of employing an end plate having liquid passageway openings of fixed orientation. The adjustable nozzles 58 can be seated in the outlet ports 22 at the end face 12 of a tool holder 10 and oriented to deflect liquid coolant from the liquid distribution ducts 22 at any desired angle relative to the end face 12 of the tool holder 10. The nozzle bodies 60 of the nozzles 58 are tubular an extend into the liquid distribution ducts 22 a short distance. The bodies 60 house deflecting spheres 62 which have channels therethrough. The deflecting spheres 62 can be oriented within the nozzle bodies 60 as desired to achieve a desired angle of coolant deflection.

Figure 1:
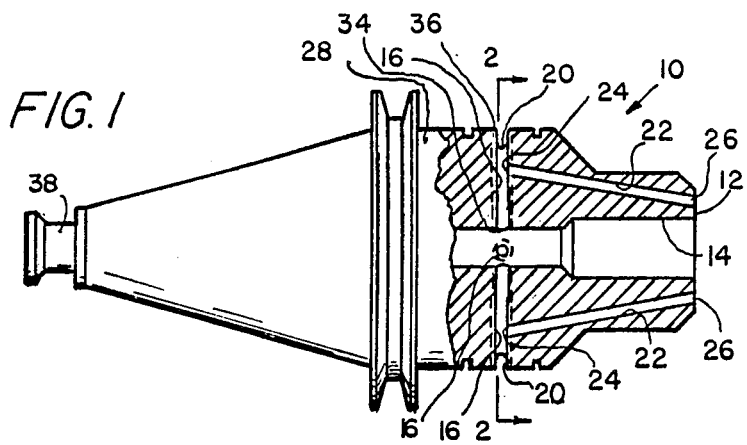
FIG. 1 is a side elevational view showing one embodiment of a tool holder of the improved chuck of the invention, viewed partially in section taken along the tool holder axis.

Undoubtedly, numerous variations and modifications of the invention will become readily apparent to those familiar with metal cutting machining operations. For example, if a tool holder will not be operated with liquid supplied through an annular collar of the type depicted in FIG. 3, the tool holder can be strengthened by eliminating the arcuate troughs 20, so that the radial bores intersect the outer cylindrical surface of the tool holder in circular interface openings. The elimination of the troughs 20 will strengthen the structure of the tool holder. Alternatively, if the tool holder does not have a central, axial liquid coolant passageway, it can be strengthened if the radial bores 16 are blind bores and extend into the structure of the tool holder only a short distance sufficient to intersect the liquid distribution ducts 22 or 22'. Also, it should be understood that interchangable end plates can be used with tool holders where the cooling liquid distribution ducts are either parallel to the tool holder axis, as in FIG. 4, or inclined thereto as in FIGS. 1 and 3.

Other modifications are also possible For example, the bores 16 need not be radial but can be merely transverse to the axis of the tool holder 10. Plugs can be engaged in such transverse bores by fastening means other than threads. Accordingly, the scope of the invention should not be construed as limited to the specific embodiments of the improved rotary tool chuck depicted and described herein, but rather is defined in the claims appended hereto.

I claim:

1. An improved chuck for a cylindrical rotary tool for cutting away metal comprised of cylindrical, annular rotatable tool holder having a transverse end face in which an axial bore is defined to receive said cylindrical tool, a plurality of radial liquid distribution bores defined in said tool holder and tapped to receive plugs threadably engaged therein, a plurality of arcuate transverse, concave grooves defined in the outer surface of said tool holder, one at each of said radial bores and located remote from said end face, thereby defining a plurality of discontinuous, arcuate cooling liquid distribution troughs, a plurality of cooling liquid distribution ducts defined in said tool holder so as to intersect said radial liquid distribution bores proximate to said liquid distribution troughs at an inclination toward the axis of said tool holder so as to terminate in outlet ports in said end face, and wherein said outlet ports are located closer to the axis of said tool holder than are the intersections of said cooling liquid distribution ducts with said radial liquid distribution bores, and a central axial passageway remote from said transverse end face and intersecting said radial liquid distribution bores, and further characterized in that said radial bores are internally threaded between their intersections with said liquid distribution ducts and their intersections with said liquid distribution ducts and their intersections with said central, axial passageway, and further comprising plugs threadably engaged with said radial bores between their intersections with said liquid distribution ducts and their intersections with said central, axial passageway, and an annular cooling liquid distribution collar having a cooling liquid inlet and positioned about said tool holder and in sliding, contact therewith in communication with said cooling liquid distribution troughs, whereby said tool holder is rotatable within said annular collar, thereby defining a cooling liquid path of travel from said cooling liquid inlet, through said annular collar into said distribution troughs, radially inwardly into said radial bores and through said liquid distribution ducts to emerge from said end face.

2. An improved chuck for a cylindrical rotary tool for cutting away metal comprised of a cylindrical annular rotatable tool holder having a transverse end face in which an axial bore is defined to receive said cylindrical tool, a plurality of radial liquid distribution bores defined in said tool holder and tapped to receive plugs threadably engaged therein, a plurality of arcuate transverse, concave defined in the outer surface of said tool holder, one at each of said radial bores and located remote from said end face, thereby defining a plurality of discontinuous, arcuate cooling liquid distribution troughs, a plurality of cooling liquid distribution ducts defined in said tool holder so as to intersect said radial liquid distribution bores proximate to said liquid distribution troughs at an inclination toward the axis of said tool holder so as to terminate in outlet ports in said end face, and wherein said outlet ports are located closer to the axis of said tool holder than are the intersections of said cooling liquid distribution ducts with said radial liquid distribution bores, and a central, axial cooling liquid passageway remote from said transverse end face and intersecting said radial liquid distribution bores, and further characterized in that said radial bores are internally threaded at intersections with said liquid distribution troughs and at intersections with said axial passageway to thereby accommodate plugs threadably engaged with said radial bores at intersections of said radial bores with said liquid distribution troughs, and alternatively at said intersections of said radial bores with said axial passageway, thereby defining a cooling liquid path of travel radially through said bores to said plugs, and through said liquid distribution ducts to emerge from said end face alternatively from said central, axial cooling liquid passageway, and from said liquid distribution troughs.

3. An improved end mill chuck comprising: a cylindrical annular tool holder having a transverse end face with an axial bore therein adapted to receive the shank of a solid, cylindrical end mill, a plurality of transverse liquid distribution bores, defined in said tool holder an adapted to engageably receive plugs therein, a central, axial cooling liquid passageway remote from said transverse in face an intersecting said transverse liquid distribution bores, discontinuous liquid distribution troughs defined in the outer surface of said tool holder remote from said end face in a plane perpendicular to said axial bore at each of said transverse liquid distribution bores, and separate liquid distribution ducts within said tool holder intersecting each of said bores and terminating at outlet ports defined in said liquid distribution end face proximate to said axial bore therein, and means at said outlet ports for directing the flow of cooling water therethrough at an inclination toward the axis of said axial bore, and wherein said transverse bores include outer fastening means to accommodate plugs at the intersections of said transverse bores with said liquid distribution troughs, thereby defining a cooling liquid path of travel along said liquid passageway, through said transverse bores to said liquid distribution ducts and out said outlet ports, and wherein said transverse bores include inner fastening means to accommodate plugs between the intersections of said transverse bores with said liquid distribution ducts and with said central, axial cooling liquid passageway, thereby defining an alternative liquid path of travel from said liquid distribution troughs, through said radial bores to said liquid distribution ducts and out said outlet ports.

4. An improved end mill chuck according to claim 3 further comprising a stationary, annular liquid distribution collar located about said tool holder and in communication with said liquid distribution troughs, and a plug engaged with each of said inner fastening means to isolate said central axial passageway from said liquid distribution ducts.

5. An improved end mill chuck according to claim 3 wherein said means at said outlet ports for directing the flow of cooling water is further comprised of an end plate removably secured to said transverse end face and having apertures therethrough in communication with said outlet ports for diverting liquid flow therefrom toward the axis of said axial bore.

6. An improved end mill chuck according to claim 5 wherein said apertures are aligned to divert liquid flow therefrom in jets which do not intersect said axis of said axial bores.

7. An improved end mill chuck according to claim 3 wherein said means at said outlet ports for directing the flow of cooling water is comprised of a nozzle at each of said outlet ports.

8. An improved chuck for a cylindrical rotary tool for cutting away metal comprised of a cylindrical, annular rotatable tool holder having a transverse end face in which an axial bore is defined to receive said cylindrical tool, a plurality of radial liquid distribution bores defined in said tool holder remote from said end and adapted to receive plugs therein, a central axial cooling liquid passageway remote from said transverse end relative to said radial liquid distribution bores and intersecting said radial liquid distribution bores, a plug located in each of said radial liquid distribution bores, and a plurality of cooling liquid distribution ducts are defined in said tool holder so as to be linear throughout their lengths and spaced radially outwardly from said axial bore and so as to have ends that terminate remote from said transverse end and intersect said radial liquid distribution bores between said plugs and said central, axial cooling liquid passageway, and with opposite ends that terminate in outlet port means in said end spaced radially outwardly from said axial bore, and said outlet port means direct liquid coolant from said liquid distribution ducts at an inclined angle toward the axis of said axial bore.

9. An improved chuck according to claim 8 wherein said cooling liquid distribution ducts are oriented at an inclination toward the axis of said tool holder and said outlet port means are located closer to the axis of said tool holder than are the intersections of said cooling liquid distribution ducts with said radial liquid distribution bores.

10. An improved chuck according to claim 8 further comprising an end plate releasably secured to said transverse end wherein said outlet port means include liquid passageway openings in said end plate.

* * * * *